(12) United States Patent
Hamaguchi et al.

(10) Patent No.: US 9,671,543 B2
(45) Date of Patent: Jun. 6, 2017

(54) PATTERNED RETARDATION FILM, PATTERNED POLARIZING PLATE, IMAGE DISPLAYING DEVICE, AND STEREO PICTURE DISPLAYING SYSTEM

(71) Applicant: FUJIFILM Corporation, Tokyo (JP)

(72) Inventors: Yuya Hamaguchi, Kanagawa (JP); Yujiro Yanai, Kanagawa (JP); Junichi Hirakata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 233 days.

(21) Appl. No.: 14/225,989

(22) Filed: Mar. 26, 2014

(65) Prior Publication Data

US 2014/0198272 A1    Jul. 17, 2014

Related U.S. Application Data

(63) Continuation of application No. PCT/JP2012/073894, filed on Sep. 19, 2012.

(30) Foreign Application Priority Data

Sep. 27, 2011 (JP) .................. 2011-210205
Aug. 29, 2012 (JP) .................. 2012-188574

(51) Int. Cl.
*G02B 5/30* (2006.01)
*G02B 27/28* (2006.01)
(Continued)

(52) U.S. Cl.
CPC ........... *G02B 5/3083* (2013.01); *G02B 27/26* (2013.01); *G02F 1/13363* (2013.01);
(Continued)

(58) Field of Classification Search
CPC .. G02B 5/3083; G02B 27/26; G02B 27/2214; G02F 1/133528; G02F 1/13363; G02F 2001/133631; H04N 13/0434
(Continued)

(56) References Cited

U.S. PATENT DOCUMENTS 6,046,787 A    4/2000 Nishiguchi
6,124,907 A *  9/2000 Jones ................... G02B 5/3033
                                                     349/106
(Continued)

FOREIGN PATENT DOCUMENTS

JP    10-253824 A    9/1998
JP    2003-262879 A  9/2003
(Continued)

OTHER PUBLICATIONS

First Office Action issued by the State Intellectual Property Office of China on Dec. 3, 2015 in connection with Chinese Patent Application No. 201280047182.7.
(Continued)

*Primary Examiner* — Bumsuk Won
*Assistant Examiner* — Collin X Beatty
(74) *Attorney, Agent, or Firm* — Edwards Neils LLC; Jean C. Edwards, Esq.

(57) ABSTRACT

To reduce the crosstalk caused by the optical characteristic of the support film. A patterned retardation film comprising at least a support film (14) having optical anisotropy and a patterned retardation layer (12) disposed on the support film and having a first retardation region and a second retardation region, at least one of an in-plane slow axis direction and a retardation being different between the first and second retardation regions, wherein a variation in the in-plane slow axis direction of the support film is 3° or more.

21 Claims, 2 Drawing Sheets

(51) Int. Cl.
| | |
|---|---|
| *H04N 13/04* | (2006.01) |
| *G02B 27/26* | (2006.01) |
| *G02F 1/1335* | (2006.01) |
| *G02F 1/13363* | (2006.01) |
| *G02B 27/22* | (2006.01) |

(52) U.S. Cl.
CPC ... *G02F 1/133528* (2013.01); *H04N 13/0434* (2013.01); *G02B 27/2214* (2013.01); *G02F 2001/133631* (2013.01)

(58) Field of Classification Search
USPC ........................................ 359/489.07, 489.01
See application file for complete search history.

(56) References Cited

U.S. PATENT DOCUMENTS

| | | | |
|---|---|---|---|
| 6,128,059 | A | 10/2000 | Nishiguchi |
| 8,089,569 | B2 | 1/2012 | Hoshi |
| 8,223,280 | B2 | 7/2012 | Hoshi |
| 8,305,503 | B1 | 11/2012 | Hoshi |
| 2008/0192191 | A1* | 8/2008 | Nakamura .......... G02F 1/13363 349/117 |
| 2008/0239485 | A1* | 10/2008 | Kuroda ................ G02B 5/3083 359/485.01 |
| 2010/0177175 | A1* | 7/2010 | Chen ...................... G02B 27/26 348/58 |
| 2010/0245998 | A1* | 9/2010 | Walworth .............. G02B 27/26 359/465 |
| 2010/0265433 | A1 | 10/2010 | Hoshi |
| 2011/0149208 | A1 | 6/2011 | Hoshi |
| 2012/0268435 | A1 | 10/2012 | Hoshi |
| 2014/0198272 | A1 | 7/2014 | Hamaguchi et al. |

FOREIGN PATENT DOCUMENTS

| | | |
|---|---|---|
| JP | 4508280 B2 | 5/2010 |
| JP | 5635571 B2 | 10/2014 |

OTHER PUBLICATIONS

Japanese Official Action issued on Mar. 11, 2014 in connection with Japanese Patent Application No. 2012-188574.
Japanese Official Action issued on May 20, 2014 in connection with Japanese Patent Application No. 2012-188574.
International Preliminary Report on Patentability issued on Apr. 10, 2014, in connection with priority application No. PCT/JP2012/073894.
International Search Report issued in PCT/JP2012/073894 on Dec. 25, 2012.
Written Opinion issued in PCT/JP2012/073894 on Dec. 25, 2012.
Japanese Official Action issued by the Japanese Patent Office on Feb. 9, 2016 in connection with Japanese Patent Application No. 2014-211670.
Office Action issued by the Taiwan Intellectual Property Office on Aug. 18, 2016, in connection with Taiwanese Patent Application No. 101135144.

\* cited by examiner (a) Mask A (b) Mask B

PATTERNED RETARDATION FILM, PATTERNED POLARIZING PLATE, IMAGE DISPLAYING DEVICE, AND STEREO PICTURE DISPLAYING SYSTEM

This application is a continuation of PCT/JP2012/073894, filed on Sep. 19, 2012, which was published under PCT article 21(2) in Japanese, and which in turn claims priority under 35 U.S.C. §119 of Japanese Patent Application No. 210205/2011, filed on Sep. 27, 2011, and Japanese Patent Application No. 188574/2012, filed on Aug. 29, 2012, the content of all of which are herein incorporated by reference in their entirety.

TECHNIQUE FIELD

The present invention relates to a patterned retardation film useful as an optical film for 3D image display, and a patterned polarizing plate, an image displaying device and a stereo picture displaying system which include the film.

BACKGROUND ART

A 3D image displaying device which displays stereo pictures needs an optical member for forming a right eye image and a left eye image which are, for example, oppositely circularly polarized images. Such an optical member in use is, for example, a patterned retardation film having regions that have different slow axes and different retardations and are regularly disposed in plane. The support for a patterned retardation layer has been made of isotropic glass (for example, Patent Literature 1), while an increasing demand for productivity leads to use of supports made of a transparent resin film. Unfortunately, the support made of a resin has a retardation to cause distortion of emitted circularly polarized light, as described in Patent Literature 1.

Patent Literature 2 discloses an arrangement of the slow axis of the support parallel or orthogonal to the bisector of the slow axis of the patterned region to eliminate the difference between the state of the circularly polarized light received by the right eye and that received by the left eye. This technology does not attain any fundamental solution to crosstalk.

CITATION LIST

Patent Literature

Patent Literature 1: Japanese Patent Application Laid-Open No. 10-253824
Patent Literature 2: Japanese Patent No. 4508280

SUMMARY OF INVENTION

Technical Problem to be Solved by the Invention

An object of the present invention is to provide a patterned retardation film and patterned polarizing plate that contribute to a reduction in crosstalk, and an image displaying device and a stereo picture displaying system which include the patterned retardation film or the patterned polarizing plate and attain a reduction in crosstalk.

Means for Solution to Problem

Means for solving the problems described above are shown below.

[1] A patterned retardation film comprising at least:
a support film having optical anisotropy, and
a patterned retardation layer disposed on the support film and having a first retardation region and a second retardation region, at least one of an in-plane slow axis direction and a retardation being different between the first and second retardation regions,
wherein a variation in the in-plane slow axis direction of the support film is 3° or more.
[2] The patterned retardation film according to [1], wherein the variation in the in-plane slow axis direction of the support film is 5° or more.
[3] The patterned retardation film according to [1] or [2], wherein the variation in the in-plane slow axis direction of the support film is 7° or more.
[4] The patterned retardation film according to any one of [1] to [3], wherein the in-plane retardation Re(550) at a wavelength of 550 nm of the support film is 20 nm or less.
[5] The patterned retardation film according to any one of [1] to [4], wherein the Re(550) of the support film is 10 nm or less.
[6] The patterned retardation film according to any one of [1] to [5], wherein the Re(550) of the support film is 5 nm or less.
[7] The patterned retardation film according to any one of [1] to [6], wherein the first and second retardation regions have an Re(550) of 110 to 165 nm and in-plane slow axes in the first and second retardation regions are orthogonal to each other.
[8] A patterned polarizing plate comprising at least:
the patterned retardation film according to any one of [1] to [7], and
a linearly polarizing film.
[9] An image displaying device comprising:
an image display panel, and
the patterned retardation film according to any one of [1] to [7] or the patterned polarizing plate according to [8], which is disposed on a surface on a viewer side of the image display panel.
[10] A stereo picture displaying system comprising:
the image displaying device according to [9], and
a polarizing plate disposed between the image displaying device and a viewer.

Advantageous Effect of Invention

The configuration according to the present invention can reduce the crosstalk caused by the retardation of the support, even if the retardation of the support cannot be zero.

EMBODIMENTS FOR CARRYING OUT THE INVENTION

Figure 1:
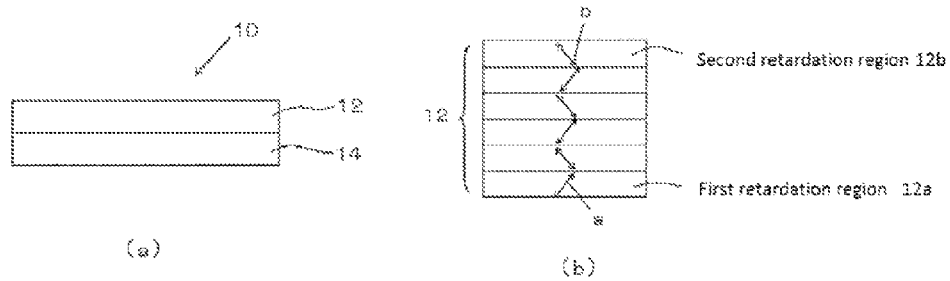
FIG. 1a is a schematic sectional view of an exemplary patterned retardation film according to the present invention.
FIG. 1b is a schematic top view of the film.

The invention is described in detail hereinbelow Note that, in this patent specification, any numerical expressions in a style of " . . . to . . . " will be used to indicate a range including the lower and upper limits represented by the numerals given before and after "to", respectively.

In this description, Re($\lambda$) is retardation in plane at a wavelength of $\lambda$. Re($\lambda$) is measured by applying light having a wavelength of $\lambda$ nm to a film in the normal direction thereof and using KOBRA 21ADH or WR (by Oji Scientific Instruments). The wavelength $\lambda$ nm for the measurement can be selected by replacing a wavelength selection filter manually or by changing the value of the wavelength $\lambda$ nm for the measurement through a program or any other means.

Throughout the specification, the wavelength for the measurement of a refractive index is 550 nm, unless otherwise specified.

1. Patterned Retardation Film

The present invention relates to a patterned retardation film comprising a support film having optical anisotropy; and a patterned retardation layer disposed on the support film and having a first retardation region and a second retardation region, at least one of an in-plane slow axis direction and a retardation being different between the first and second retardation regions, wherein a variation in an in-plane slow axis direction of the support film is 3° or more. The patterned retardation film according to the present invention is disposed, for example, on the surface on a viewer side of an image display panel in a stereo picture displaying apparatus and is used to separate a polarized image for the left eye and a polarized image for the right eye from each other.

In an embodiment of a patterned retardation film, the first and second retardation regions have an Re(550) of approximately $\lambda$/4, and the in-plane slow axis of the first retardation region is orthogonal to that of the second retardation region. The linearly polarized light for an image enters the patterned retardation film, and the light components passing through the first retardation region and the second retardation region are converted into oppositely circularly polarization image. When a viewer wears circularly polarized light glasses having left and right lenses including oppositely circularly polarizing plates, the right eye of the viewer can receive only the circularly polarization image for the right eye and the left eye can receive only the circularly polarization image for the left eye. If images having parallax enter the left eye and the right eye respectively, the viewer recognizes a stereo picture.

The patterned retardation film, including the film support for the patterned retardation layer, however cannot convert the incident light into ideal polarization images for the left eye and for the right eye due to optical characteristics of the film used for the support. The circularly polarized light emitted from the patterned retardation film has distortion causing crosstalk when the stereo picture is viewed. Although such an adverse effect of the support film can be reduced by decreasing the retardation of the film used for the support, a film having completely no retardation cannot be readily achieved. If attained, such a film does not satisfy practical utility such as productivity.

The in-plane slow axis of the film used for the support in the present invention is oriented at random. Then, the first and second retardation regions in the patterned retardation layer are affected at random by the retardation of the support film while the effect by the retardation of the support film are averaged over the entire support film. This can reduce the occurrences of the crosstalk. The variation in the in-plane slow axis direction of the retardation film has been reduced as much as possible to attain the uniformity of the in-plane slow axis of the film. This technique has been believed to be a preferred technique to improve the display characteristics of the retardation films used in image displaying devices such as liquid crystal display devices, and has been studied and developed in many ways. In view of this, the present invention provides a solution to crosstalk inherent in the 3D displays through a technical concept defying the improvements in technology based on common knowledge.

The term "randomized in-plane slow axis" means that the variation in the in-plane slow axis direction measured by the method described later is 3° or more. The variation is preferably 5° or more, more preferably 7° or more, still more preferably 10° or more, most preferably 15° or more. At a variation of 3° or more, the crosstalk caused by the retardation in the film can be decreased even if the film which is used for the support is not isotropic.

A greater variation in the in-plane slow axis direction is preferred for the effect of reducing the crosstalk caused by the optical characteristics of the support film. The variation has no upper limit for this effect, but the upper limit is 90° actually.

A support film having a high retardation may impair the effect of the present invention. Consequently, the support film preferably should have a small Re(550). The Re(550) is preferably 20 nm or less, more preferably 10 nm or less, and most preferably 5 nm or less. Although a completely isotropic support film is ideal for the 3D display device, such a support film does not change the polarization state of the light passing through the support film and cannot attain the effect of the present invention. The effect of the present invention is noticeable if the support film has an anisotropy and the anisotropy is slight. Meanwhile, it is difficult to produce a completely isotropic film. In the present invention, the film, although not completely isotropic, has a randomized in-plane slow axis, and can decrease the crosstalk more significantly than a film having a uniform in-plane slow axis and the same retardation as that of the film according to the present invention.

The patterned retardation film according to the present invention includes a patterned retardation layer having the first and second retardation regions. At least one of the in-plane slow axis direction and the retardation is different between the first and second retardation regions. The pattern may have any shape and disposition. To prevent uneven left eye and right eye images, the first and second retardation regions preferably have an identical shape, and are disposed evenly and symmetrically. Examples of such a patterned retardation layer include a patterned retardation layer having striped first and second retardation regions that have the same width and are alternately disposed.

The first and second retardation regions in the patterned retardation film according to the present invention may have any configuration. The first and second retardation regions may have any pattern that can separate the incident light into polarized light components for the right eye image and for the left eye image in combination with a linearly polarizing film. Examples of the Re's of the first and second retardation regions, the relation between the in-plane slow axis of the first retardation region and that of the second retardation region, and the relation with the absorption axis of the linearly polarizing film will be shown below.

TABLE 1

| Embodiment | First retardation region Re | Second retardation region Re | Relation between the in-plane slow axis | Relation with the absorption axis of the linearly polarizing film |
|---|---|---|---|---|
| First embodiment | λ/4 | λ/4 | Orthogonal to each other | ±45° |
| Second embodiment | λ/4 | 3λ/4 | Parallel to each other | ±45° |
| Third embodiment | 0 | λ/2 | — | ±45° |
| Fourth embodiment | 3λ/4 | λ/4 | Parallel to each other | ±45° |
| Fifth embodiment | λ/2 | 0 | — | ±45° |

FIG. 1a is a schematic sectional view of an exemplary patterned retardation film according to the present invention, and FIG. 1b is a schematic top view of the film. The patterned retardation film illustrated in FIG. 1 includes the patterned retardation layer according to the first embodiment in Table 1.

As illustrated in the schematic sectional view FIG. 1a, a patterned retardation film 10 of FIG. 1 includes a support film 14, and a patterned retardation layer 12 disposed thereon. Between the patterned retardation layer 12 and the support film 14, an alignment film may be disposed and used for formation of the patterned retardation layer 12. For example, the alignment film has first and second alignment control regions which are composed of an identical liquid crystal composition and can be aligned in different directions (specifically in the orthogonal directions on the long axis of the liquid crystal each other). The alignment film can be prepared by masked exposure or masked rubbing, for example. Alternatively, a patterned retardation layer may be preliminarily disposed on a temporary support with the alignment film and then be transferred onto the support film 14. In this case, the patterned retardation film may not include the alignment film.

As illustrated in the schematic top view in FIG. 1b, the patterned retardation layer 12 is preferably a patterned retardation layer having first and second retardation regions 12a and 12b disposed evenly and symmetrically. Preferably the first retardation region 12a has an in-plane slow axis a and the second retardation region 12b has an in-plane slow axis b orthogonal to the in-plane slow axis a. Preferably the Re should be approximately λ/4 (specifically 110 to 165 nm, preferably 120 to 145 nm).

The patterned retardation film according to the present invention may have one or more functional layers. Examples of such functional layers include a hard coat layer and an anti-reflection layer. These layers may be disposed on the support film to prepare a laminated film, and the laminated film may be bonded to the patterned retardation film according to the present invention. Alternatively, before or after the patterned retardation layer is disposed, the functional layer(s) may be bonded or applied to the rear surface of the support film (surface opposite to the surface on which the patterned retardation layer is to be disposed). Alternatively, after the patterned retardation layer is disposed, the functional layer(s) may be bonded or applied to the surface of the patterned retardation layer directly, for example.

The patterned retardation film according to the present invention can be produced by any method. One exemplary method involves:
preparing a support film,
disposing an alignment film on a surface of the film, the alignment film having different alignment control abilities,
disposing a coating layer comprising a liquid crystal composition on the surface of the alignment film, and subjecting the coating layer to alignment, and
fixing the alignment of the coating layer to form a first and second retardation regions.

A treatment for attaining the randomized in-plane slow axis of the film can be performed simultaneously with one or more of the steps, or performed once or more between any two of the steps. Typically, the treatment is performed on the support film before disposing the alignment film, or performed during producing the support film.

The film used as a support is preferably a film which contains, as a main component, a polymer or a resin which is excellent in optical transparency, mechanical strength, heat stability, moisture shutoff performance and isotropy. Examples thereof include: polycarbonate series polymers, polyester series polymers such as polyethylene terephthalate and polyethylene naphthalate, acryl series polymers such as polymethylmethacrylate, and styrene series polymers such as polystyrene and acryl nitrile/styrene copolymer (AS resin). Specific examples thereof include also polyolefins such as polyethylene and polypropylene, polyolefin series polymers such as ethylene/propylene copolymers, vinyl chloride series polymers, amide series polymers such as nylon and aromatic polyamide, imide series polymers, sulfone series polymers, polyether sulfone series polymers, polyether ether ketone series polymers, polyphenylene sulfide series polymers, vinylidene chloride series polymers, vinyl alcohol series polymers, vinyl butyral series polymers, arylate series polymers, polyoxymethylene series polymers, epoxy series polymers and any mixtures thereof. The polymer film of the present invention may be a hardened layer composed of an ultraviolet hardening resin or a heat hardening resin such as acrylic, urethane, acrylic urethane, epoxy, or silicone resin.

As the main component of the film used as a support, a thermoplastic norbornene resin is preferably used. As the thermoplastic norbornene resin, there are mentioned Nippon Zeon's Zeonex and Zeonoa; JSR's Arton, etc.

The main component of the film used as a support is preferably a cellulose polymer such as triacetylcellulose (hereinafter referred to as cellulose acylate), which has been used for the transparent protective film in the polarizing plate.

The aforementioned film used as a support should preferably have a small retardation. To decrease the Re of the film, one or more additives may be added to the film. An additive that can reduce the optical anisotropy of the film is not particularly limited, and any known additive can be used.

The support film should preferably be treated for attaining the randomized in-plane slow axis. An exemplary treatment involves relaxing the alignment of the main component polymer aligned in a predetermined direction during the film production process. In an embodiment of the treatment, the film is heated. In another embodiment of the treatment, an organic solvent such as acetone is applied to the surface of the film (preferably both surfaces of the film) and the film is dried. The applied organic solvent partially permeates the film to promote relaxation of the alignment of the main component polymer in the film.

The randomized in-plane slow axis of the film is not always attained by the treatment intendedly performed. For example, the randomized in-plane slow axis of the film can be attained by adjusting film production conditions so as not to promote the alignment of the main component polymer during the film production process. An exemplary method is a reduction in tension applied to the film during the film production process. In the solution film forming method, tension is usually applied to the film in the step of drying the film to evaporate the solvent. If the film is dried in the drying step under the conditions not to apply excessive tension to the film, the randomized in-plane slow axis can be attained. The in-plane slow axis is more readily randomized, as the amount of the solvent remaining in the dried film increases. A smaller draw ratio of the film and a lower stretch temperature also contribute to the randomized in-plane slow axis.

Alignment Film:

An exemplary alignment film usable for the present invention is a patterned alignment film having first and second alignment control regions formed by masked exposure or masked rubbing and having different alignment control abilities. Examples of such an alignment film include an alignment film in which the slow axis of the liquid crystal molecule is parallel to the rubbing direction in the alignment film irradiated with ultraviolet light and orthogonal to the rubbing direction in the alignment film not irradiated with ultraviolet light. The alignment film may be produced by masked rubbing. Alternatively, a photo-alignment film may be used.

Patterned Retardation Layer:

The patterned retardation layer included in the patterned retardation film according to the present invention can be formed of a liquid crystal composition. Any liquid crystal can be used without limitation, and discotic liquid crystals and rod-like liquid crystals can be used. The retardation region having an Re(550) of approximately λ/4 can be formed by fixing the vertical alignment of the discotic liquid crystal (the discotic plane of the liquid crystal is vertical to the surface of the layer) or by fixing the horizontal alignment of the rod-like liquid crystal (the long axis of the liquid crystal is horizontal to the surface of the layer).

Embodiments of a method of forming a patterned retardation layer will be described.

In a method according to a first embodiment, a plurality of effective actions is utilized to control the alignment of the liquid crystal, and one or more of the actions are canceled by an external stimulus (such as heating) to control a predetermined alignment action to be dominant. For example, the liquid crystal is aligned in a predetermined state by the combined action of the alignment control ability of the alignment film and the alignment control ability of the alignment controlling agent added to the liquid crystal composition. The alignment of the liquid crystal is fixed to form one of the retardation regions. One of the actions (e.g., the action of the alignment controlling agent) is then canceled by an external stimulus (such as heating) to control the other alignment action(s) (the action by the alignment film) to be dominant. Thereby, a different alignment is attained. The different alignment is fixed to form the other retardation region. For example, a predetermined pyridinium compound or imidazolium compound which is described below has a hydrophilic pyridinium group or imidazolium group and is eccentrically present on the surface of a hydrophilic polyvinyl alcohol alignment film. In particular, in a pyridinium group having an amino substituent acting as an acceptor of a hydrogen atom, an intermolecular hydrogen bond is generated between the pyridinium group and the polyvinyl alcohol. This hydrogen bond causes a pyridinium derivative to be eccentrically present at a higher density on the surface of the alignment film, and the pyridinium derivative is aligned orthogonal to the main chain of the polyvinyl alcohol to promote the alignment of the liquid crystal orthogonal to the rubbing direction. A predetermined pyridinium derivative which is described below has two or more aromatic rings in the molecule to produce a strong intermolecular π-π interaction with the liquid crystal, especially with the discotic liquid crystal. Such a strong intermolecular interaction induces the orthogonal alignment of the discotic liquid crystal at the interface of the alignment film. If a hydrophobic aromatic ring is bonded to a hydrophilic pyridinium group, the hydrophobicity of the aromatic ring induces the vertical alignment of the discotic liquid crystal. The pyridinium derivative loses the induced effect by heat exceeding a certain temperature due to hydrogen bond scission, and reduces the localization of the pyridinium compound on the surface of the alignment film and the density thereof, cancelling the action by the pyridinium compound. As a result, the liquid crystal is horizontally aligned by the restraining force of a rubbed alignment film itself. The details of the method are described in Japanese Patent Application Laid-Open No. 2012-008170, and the content is incorporated herein by reference.

In a method according to a second embodiment, a patterned alignment film is used. In this embodiment, a patterned alignment film having different alignment control abilities is prepared. A liquid crystal composition is disposed on the film, and the liquid crystal is aligned. The liquid crystal is aligned according to these different alignment control abilities of the patterned alignment film to attain different alignments. The different alignments of the liquid crystal are fixed to form patterned first and second retardation regions according to the pattern of the alignment film. The patterned alignment film can be prepared by any process, such as printing, masked rubbing of rubbing alignment film, and masked exposure of a photo-alignment film. Alternatively, the patterned alignment film can be prepared by forming a uniform alignment film and printing a predetermined pattern of an additive (such as an onium salt) that gives an effect on the alignment control ability. The printing is preferred, which can readily produce the patterned alignment film without a large facility. The details of the method are described in Japanese Patent Application Laid-Open No. 2012-032661, and the content is incorporated herein by reference.

In this embodiment, the alignment film is subjected to a treatment, such as masked exposure using a mask.

In a third embodiment, an alignment film containing a photoacid generator is used. In this embodiment, a photoacid generator is added to the alignment film. The photoacid generator decomposes during patterned exposure of the alignment film with light to form a region in which an acid compound is generated and another region in which no acid compound is generated. The photoacid generator barely decomposes in a portion not irradiated with light. The interaction between the material for the alignment film, the liquid crystal, and the alignment controlling agent to be added, if desired, predominates the alignment state to orient the slow axis of the liquid crystal orthogonal to the rubbing direction. When the alignment film is irradiated with light to generate an acid compound, the interaction no longer predominates the alignment. Instead, the rubbing direction of the rubbed alignment film predominates the alignment to horizontally align the slow axis of the liquid crystal parallel to the rubbing direction. The photoacid generator added to the alignment film is preferably a water-soluble compound. Examples of the photoacid generator are described in Prog. Polym. Sci., Vol. 23, p. 1485 (1998). Preferred photoacid generators are pyridinium salts, iodonium salts, and sulfonium salts. The details of the method are described in Japanese Patent Application No. 2010-289360, and the content is incorporated herein by reference.

The embodiments of the method of forming a pattern are only for exemplary illustration, not for limitation.

2. Patterned Polarizing Plate

The present invention also relates to a patterned polarizing plate including the patterned retardation film according to the present invention and a linearly polarizing film. The linearly polarizing film may be bonded to the surface of the patterned retardation layer or to the surface of the support film. Another film (such as a protective film for the linearly polarizing film) may be disposed between the linearly polarizing film and the patterned retardation film according to the present invention. In this case, this another film preferably has a randomized in-plane slow axis and a low retardation, and the preferred ranges thereof are the same as those for the film used as a support. Preferably, no film is disposed between the linearly polarizing film and the patterned retardation film according to the present invention.

Figure 2:
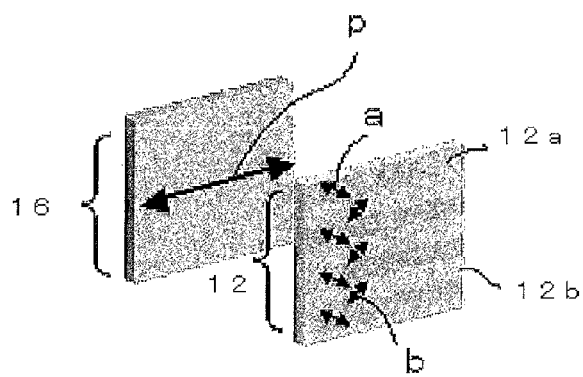
FIG. 2 is a schematic view illustrating an exemplary relation between the in-plane slow axis of the patterned retardation film according to the present invention and the absorption axis of a linearly polarizing film.

The patterned retardation film 10 illustrated in FIG. 1 is preferably bonded to the linearly polarizing film while an absorption axis P of the linearly polarizing film 16 intersects at ±45° with the in-plane slow axes of the first and second retardation regions 12a and 12b in the patterned retardation layer 12, as schematically illustrated in FIG. 2.

The present invention also relates to an image displaying device and a stereo picture displaying system which include the patterned retardation film or patterned polarizing plate according to the present invention and an image display panel. The patterned retardation film or patterned polarizing plate according to the present invention is disposed on a viewer side of the image display panel, and converts an image displayed on the display panel into polarized light components such as circularly or linearly polarized light components for the left eye image and the right eye image. The viewer receives these light components through a polarizing plate such as glasses for circularly or linearly polarized light, and recognizes the light components as a stereo picture.

In the present invention, the image display panel is not particular limited. The image display panel may be a liquid crystal panel including a liquid crystal layer, an organic EL display panel including an organic EL layer, or a plasma display panel. These image display panels can have various configurations. In an embodiment which includes a linearly polarizing film for displaying an image on the surface of the viewer side, such as a transmissive liquid crystal panel, the aforementioned function is attained by a combination of the patterned retardation film according to the present invention with the linearly polarizing film. The surface of such a liquid crystal display panel may include the patterned polarizing plate according to the present invention having a linearly polarizing film. In this case, the absorption axis of the linearly polarizing film in the patterned polarizing plate should be disposed in the same direction as that of the absorption axis of the linearly polarizing film in the liquid crystal panel.

The stereo picture displaying system according to the present invention includes an image displaying device according to the present invention, and a polarizing plate disposed between the image displaying device and the viewer. One example of the polarizing plate is a pair of polarized glasses that the viewer wears. The pair of polarized glasses includes the polarizing plate as lenses for the left eye and the right eye. The polarizing plate may be any of a circularly polarizing plate, an elliptically polarizing plate, and a linearly polarizing plate. The polarizing plate is selected depending on the polarized image to be displayed by the image displaying device. Specifically, a pair of circularly polarized glasses including oppositely circularly polarizing plates as the lenses for the left eye and the right eye is included in an embodiment of the image displaying device according to the present invention that displays oppositely circularly polarized images.

Figure 3:
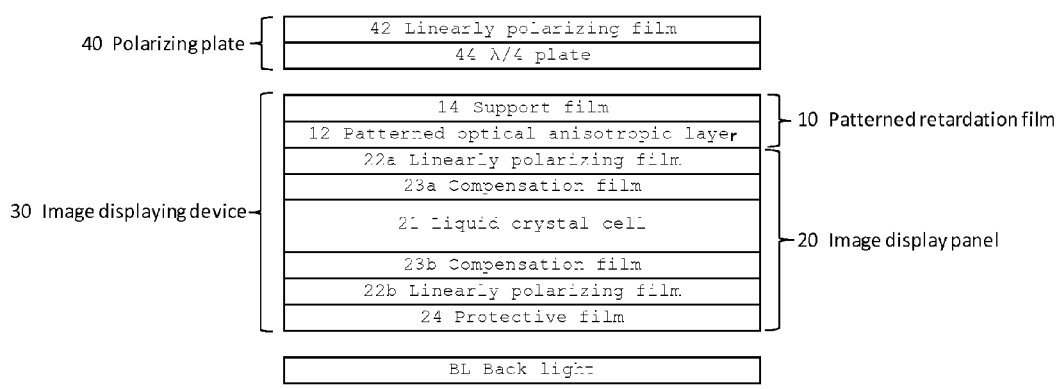
FIG. 3 is a schematic sectional view of an exemplary stereo picture displaying system according to the present invention.

FIG. 3 is a schematic sectional view illustrating an exemplary stereo picture displaying system according to the present invention. In this example illustrated in FIG. 3, the stereo picture displaying system includes a liquid crystal panel as the image display panel for the image displaying device.

The stereo picture displaying system illustrated in FIG. 3 includes an image displaying device 30, and a circularly polarizing plate 40 disposed between the image displaying device 30 and a viewer which observes the image displaying device 30. The circularly polarizing plate 40 may be circularly polarized glasses that the viewer wears.

An image display panel 20 is a liquid crystal panel including a pair of linearly polarizing films 22a and 22b having absorption axes orthogonal to each other, and a liquid crystal cell 21 disposed between the films. An optical compensation film 23a is disposed between the linearly polarizing film 22a and the liquid crystal cell 21, while an optical compensation film 23b is disposed between the film 22b and the liquid crystal cell 21. The films 23a and 23b contribute to compensation for the viewing angle of the liquid crystal cell 21. These compensation films 23a and 23b are unnecessary in the liquid crystal cell 21 driven in a certain liquid crystal driving mode, and a protective film for protecting the polarizing films 22a and 22b may be disposed instead of the films 23a and 23b. Alternatively, two or more optical compensation films 23a and 23b may be disposed in the liquid crystal cell 21 driven in a certain liquid crystal driving mode.

The patterned retardation film 10 according to the present invention exemplified in FIG. 1 is disposed on the surface of the linearly polarizing film 22a on the viewer side. The linearly polarization image from the image display panel passes through the patterned retardation film 10, and is emitted in the form of oppositely circularly polarization images for a left eye and a right eye. A viewer who wears the polarized glasses including oppositely circularly polarizing plates 40 can receive only the circularly polarization image for the right eye at his/her right eye and only the circularly polarization image for the left eye at the left eye. If images having a parallax enter into the left eye and the right eye respectively, the viewer can recognize an image as a stereo picture.

The liquid crystal panel included in the image displaying device may be of any display mode, such as a twisted nematic (TN) mode, an in-plane switching (IPS) mode, a ferroelectric liquid crystal (FLC) mode, an anti-ferroelectric liquid crystal (AFLC) mode, an optically compensatory bend (OCB) mode, a supper twisted nematic (STN) mode, a vertically aligned (VA) mode, and a hybrid aligned nematic (HAN) mode.

EXAMPLES

The features of the present invention are specifically described below, referring to Examples. Any materials, amount of use, ratio, details of processing, procedures of processing and so forth shown in Examples may appropriately be modified without departing from the spirit of the present invention. Therefore, it is to be understood that the scope of the present invention should not be interpreted in a limited manner based on the specific examples shown below.

<<Characterization>>

Methods for measuring and evaluating various properties will now be described.

[Variation in the in-Plane Slow Axis Direction]

A cut sample (70 mm by 110 mm) was prepared, and the humidity of the sample was adjusted at a relative humidity of 60% for two hours. The in-plane slow axis direction in the sample was then measured with an automatic birefringence analyzer "KOBRA AD200" (made by Oji Scientific Instruments Co., Ltd.). An entire support film was equally divided into 13 cut samples. The difference between the largest value and the smallest value was defined as the variation in the in-plane slow axis direction.

When 13 samples cannot be prepared due to its size, less than 13 prepared samples are measured. When the difference between the largest value and the smallest value was equal to or more than the value specified in the present invention, the sample (support film) was used for the patterned retardation film according to the present invention.

[Crosstalk]

A pair of 3D glasses included in a W220S (made by Hyundai It Corp.) was disposed in front of the stereo picture displaying apparatus such that the line connecting the left and right lenses in the 3D glasses was parallel to the ground. The 3D content to be displayed on the stereo picture displaying apparatus included white content to be displayed for one eye and black content to be displayed for the other eye. White brightness and black brightness were measured over the 3D glasses in a dark-room with an analyzer (BM5A, made by TOPCON CORPORATION). The front crosstalk was calculated from the following expression:

crosstalk (%)=2×black brightness/(white brightness+black brightness)×100

Reference Example 1

Preparation of Patterned Retardation Layer

Figure 4:
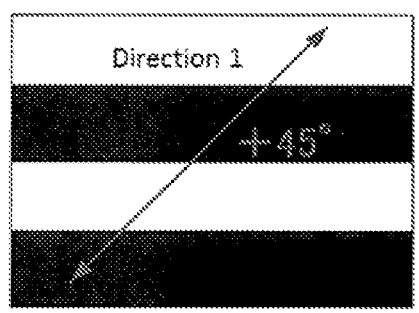
FIG. 4 is a schematic view illustrating an exemplary exposure mask.
Figure 4:
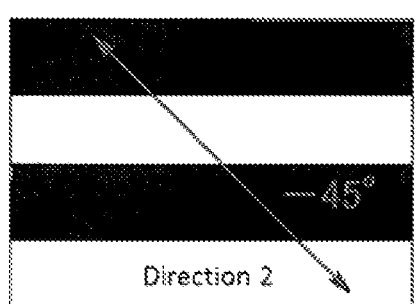

An aqueous solution of a 1% photo-alignable material E-1 having a structure described below was applied onto a glass substrate, and dried at 100° C. for one minute. The coating was irradiated with ultraviolet light of 160 W/cm² from an air-cooled metal halide lamp (made by EYE GRAPHICS CO., LTD.) in air to produce a glass substrate having a photo-alignment film. In the irradiation, as illustrated in FIG. 4a, a wire grid polarizer (made by Moxtek, Inc., ProFlux PPL02) was placed in Direction 1, and the coating was exposed with light through a striped mask A (width of a horizontal strip for a transmissive portion: 285 μm, width of a horizontal strip for a shielded portion: 285 μm). Subsequently, as illustrated in FIG. 4b, the wire grid polarizer was placed in Direction 2, and the coating was exposed with light through a striped mask B (width of a horizontal strip for a transmissive portion: 285 μm, width of a horizontal strip for a shielded portion: 285 μm). The distance between the exposure mask and the photo-alignment film was 200 μm. The irradiance of the ultraviolet light used was 100 mW/cm² in the UV-A region (integrated irradiance at wavelengths of 380 to 320 nm), and the irradiation intensity was 1000 mJ/cm² in the UV-A region.

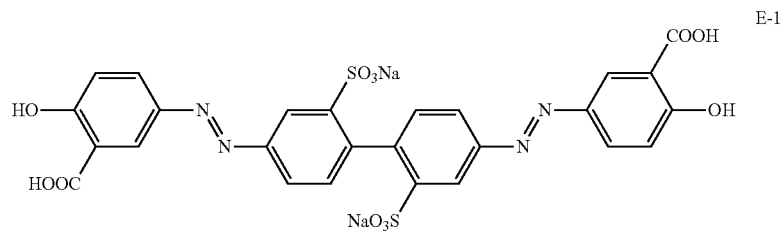

After the following composition for an optical anisotropy layer was prepared, the composition was filtered through a polypropylene filter having a pore diameter of 0.2 μm and the filtrate was used as a coating solution. The coating solution was applied to the glass substrate having a photo-alignment film, and was dried at a coating surface temperature of 105° C. for two minutes to form a liquid crystal phase. The temperature was decreased to 75° C., and then the coating was irradiated with ultraviolet light of 160 W/cm² from an air-cooled metal halide lamp (made by EYE GRAPHICS CO., LTD.) in air to fix the alignment of the liquid crystal. A patterned retardation layer was thereby prepared on the glass substrate. The optical anisotropy layer had a thickness of 1.3 μm. The first and second retardation regions had an Re(550) of 130 nm and in-plane slow axes orthogonal to each other.

| Composition for optical anisotropy layer | |
|---|---|
| Rod-like liquid crystal (LC242, made by BASF SE) | 100 parts by mass |
| Horizontal alignment agent A | 0.3 parts by mass |
| Photopolymerization initiator (IRGACURE 907, made by Ciba Specialty Chemicals Inc.) | 3.3 parts by mass |
| Sensitizer (Kayacure-DETX, made by NIPPON KAYAKU Co., Ltd.) | 1.1 parts by mass |
| Methyl ethyl ketone | 300 parts by mass |

Rod-like liquid crystal LC242: Rod-like liquid crystal disclosed WO2010/090429 A2

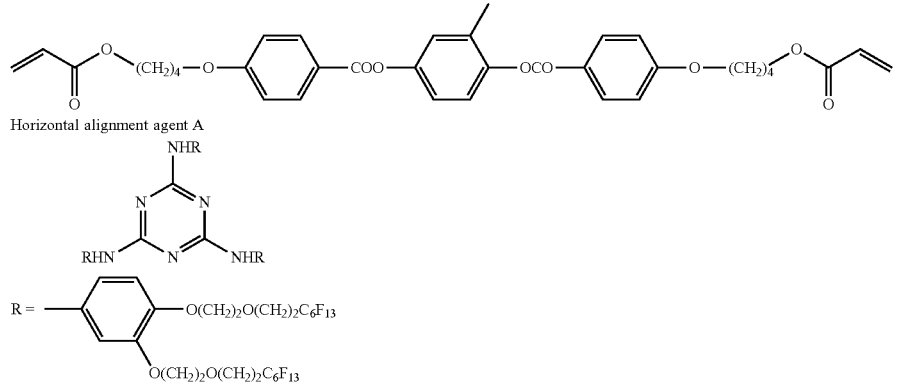

Horizontal alignment agent A

R =

Example 1

Preparation Of Cellulose Acylate Solution

The following components were placed into a mixing tank, and stirred to dissolve the components. Thus, cellulose acylate solution A was prepared.

[Composition for Cellulose Acylate Solution A]

| Cellulose acylate having a degree of acetylation of 2.94 | 100.0 parts by mass |
|---|---|
| Methylene chloride (first solvent) | 402.0 parts by mass |
| Methanol (second solvent) | 60.0 parts by mass |

(Preparation of Matting Agent Solution A)

Silica particles having an average particle size of 16 nm (AEROSIL R972, made by Nippon Aerosil Co., Ltd.) (20 parts by mass) and methanol (80 parts by mass) were sufficiently mixed for 30 minutes by stirring to prepare silica particle dispersion. The dispersion was placed into a dispersing machine with the following components. The components were stirred for 30 minutes or more to be dissolved. Thus, Matting agent solution A was prepared.

[Composition for Matting Agent Solution A]

| Silica particle dispersion (average particle size of the silica particles: 16 nm) | 10.0 parts by mass |
|---|---|
| Methylene chloride (first solvent) | 76.3 parts by mass |
| Methanol (second solvent) | 3.4 parts by mass |
| Cellulose acylate solution A | 10.3 parts by mass |

(Preparation of Additive Solution)

The following components were placed into a mixing tank. The components were stirred to be dissolved while being heated. Thus, a cellulose acetate solution was prepared. The following compound for reducing optical anisotropy and the following wavelength dispersion controller were used.

(Composition for Additive Solution)

| Retardation reducing compound shown below | 49.3 parts by mass |
|---|---|
| Wavelength dispersion controller shown below | 7.6 parts by mass |
| Methylene chloride (first solvent) | 58.4 parts by mass |
| Methanol (second solvent) | 8.7 parts by mass |
| Cellulose acylate solution A | 12.8 parts by mass |

Retardation reducing compound

Wavelength dispersion controller

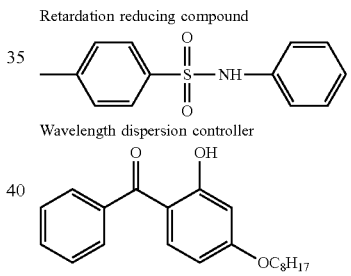

(Preparation of Cellulose Acylate Film 1)

After 94.6 parts by mass of Cellulose acylate solution A, 1.3 parts by mass of Matting agent solution A, and 4.1 parts by mass of the additive solution were separately filtered, these solutions were mixed. The mixed solution was cast with a band casting machine. The mass percentages of the retardation reducing compound and the wavelength dispersion controller were 11.7% and 1.2%, respectively, relative to cellulose acylate.

A film was peeled off from the band at 55% solvent remaining in the film. Both ends of the film were held with clips in a tenter zone, and the film was dried at 95° C. under a tension of 18 kgf/m (176 N/m). The maximum expansion rate of the film was 103% on the basis of the entrance of the tenter. At a content of the remaining solvent of 20 to 22%, the film was detached from the tenter clips, and the ends of the film were cut off with a cutter. The film was then dried while the film was being conveyed through a drying zone including groups of rolls. The drying temperature was 100 to 135° C. Thus Cellulose acylate film 1 was prepared. The film had a thickness of 80 μm.

The film was measured for the Re and the variation in the in-plane slow axis direction in accordance with the methods described above. The results are shown in Table below.

Example 2

Preparation of Cellulose Acylate Film 2

The flow volume of the dope used in Example 1 was adjusted and the solution was cast to produce a film having a thickness of 40 μm. The film was peeled off from the band at 55% solvent remaining in the film. Both ends of the film were held with clips in a tenter zone, and the film was dried at 90° C. under a tension of 15 kgf/m (147 N/m). Cellulose acylate film 2 was prepared as in Production Example 1 except that at a content of the remaining solvent of 20%, the film was detached from the tenter. The optical characteristics of the film were evaluated as in Example 1. The results are shown in Table below.

Example 3

Preparation of Cellulose acylate film 3

Cellulose acylate film 3 was prepared as in Example 1 except that the content of the remaining solvent was 50% when the film was removed from the tenter. The optical characteristics of the film were evaluated as in Example 1. The results are shown in Table below.

Example 4

Preparation of Cellulose Acylate Film 4

Cellulose acylate film 4 was prepared as in Example 1 except that the transverse tension applied to the tenter was 2 kgf/m (19.6 N/m). The optical characteristics of the film were evaluated as in Example 1. The results are shown in Table below.

Example 5

Preparation of Cellulose Acylate Solution

The following components were placed into a mixing tank, and were stirred to dissolve the components. Thus, Cellulose acylate solution B was prepared.

[Composition for Cellulose Acylate Solution B]

| | |
|---|---|
| Cellulose acetate having a degree of acetylation of 2.94 (degree of acetylation at 6th position: 0.94) | 100.0 parts by mass |
| Dichloromethane (first solvent) | 415.0 parts by mass |
| Methanol (second solvent) | 75.0 parts by mass |
| Butanol (third solvent) | 10.0 parts by mass |
| Silicon dioxide fine particles (particle size: 20 nm, Mohs hardness: about 7) | 0.4 parts by mass |

(Preparation of Cellulose Acylate Film 5)

Cellulose acylate solution B was heated to 30° C., and was cast with a band casting machine. The film was peeled off from the band at 55% solvent remaining in the film, and was dried in an air stream at 45° C. The film was then dried at 110° C. for five minutes and at 140° C. for ten minutes to prepare a transparent cellulose acylate film.

(Stretching)

The cellulose acylate film was uniaxially stretched in the longitudinal direction at 150° C. with a roll stretching machine at a draw ratio of 5%. The draw ratio was controlled by adjusting the circumferential speeds of nip rolls.

(Heating)

Both ends of the obtained film were held with the tenter clips, and the film was fed through a heating zone at 240° C. to prepare Cellulose acylate film 5. The film had a thickness of 80 μm.

The optical characteristics of the film were evaluated as in Example 1. The results are shown in Table below.

Example 6

Preparation of Cellulose Acylate Film 6

Cellulose acylate film 6 was prepared as in Example 5 except that the stretching temperature was 130° C. The optical characteristics of the film were evaluated as in Example 1. The results are shown in Table below.

Example 7

Preparation of Cellulose Acylate Film 7

Cellulose acylate film 7 was prepared as in Example 5 except that the stretching temperature was 120° C. The optical characteristics of the film were evaluated as in Example 1. The results are shown in Table below.

Example 8

Preparation of Cellulose Acylate Film 8

Cellulose acylate film 8 was prepared as in Example 5 except that the draw ratio was 0%. The optical characteristics of the film were evaluated as in Example 1. The results are shown in Table below.

Example 9

Preparation of Cellulose Acylate Film 9

Cellulose acylate film 9 was prepared as in Example 6 except that the draw ratio was 0%. The optical characteristics of the film were evaluated as in Example 1. The results are shown in Table below.

Example 10

Preparation of Cellulose Acylate Film 10

Cellulose acylate film 10 was prepared as in Example 7 except that the draw ratio was 0%. The optical characteristics of the film were evaluated as in Example 1. The results are shown in Table below.

Example 11

Preparation of Cellulose Acylate Film 11

Cellulose acylate film 11 was prepared as in Example 8 except that the heating temperature was 250° C. The optical characteristics of the film were evaluated as in Example 1. The results are shown in Table below.

Example 12

Preparation of Cellulose Acylate Film 12

Cellulose acylate film 12 was prepared as in Example 8 except that the heating temperature was 260° C. The optical characteristics of the film were evaluated as in Example 1. The results are shown in Table below.

Example 13

Preparation of Cellulose Acylate Film 13

Acetone was applied to both surfaces of Cellulose acylate film 8 to prepare Cellulose acylate film 13. The optical characteristics of the film were evaluated as in Example 1. The results are shown in Table below.

Example 14

Preparation of Cellulose Acylate Film 14

Acetone was applied to both surfaces of Cellulose acylate film 10 to prepare Cellulose acylate film 14. The optical characteristics of the film were evaluated as in Example 1. The results are shown in Table below.

Example 15

Preparation of Thermoplastic Norbornene Resin 1

Under a nitrogen atmosphere, 600 parts of dehydrated toluene, 30 parts of 1-hexene, 200 parts of 8-methylcarboxymethyltetracyclo[4.4.0.12,5.17,10]dodec-3-en e were placed in a reactor at room temperature, and mixed. The solution was then heated to 60° C. To the solution in the reactor, 0.5 parts of a solution of triethyl aluminum (1.5 mol/l) in toluene and 3.0 parts of a solution of tungsten hexachloide modified with t-butanol and methanol (t-butanol:methanol:tungsten=0.35 mol:0.3 mol:1 mol) in toluene (concentration: 0.05 mol/L) were added as polymerization catalysts. The solution was heated with stirring at 80° C. for three hours for polymerization.

Then, 3.0 parts of a hydrogenation catalyst RuHCl(CO)[P($C_6H_5$)$_3$] was added to 400 parts of the reaction solution containing the ring-opened polymer to prepare a reaction solution containing 24% of an 8-methyl-8-carboxymethyl-tetracyclo[4.4.0.12,5.17,10]-3-dode cene ring-opened hydrogenated polymer.

To the reaction solution, 0.3 parts of an antioxidant (made by Ciba Specialty Chemicals Inc., Irganox 1010) was added and dissolved per 100 parts of the polymer. While toluene as the solvent and other volatile components were being removed from the solution in a cylindrical condensation dryer (made by Hitachi, Ltd.) at a temperature of 295° C. and a pressure of 1 kPa or less, the ring-opened hydrogenated polymer was melted and extruded into a strand from an extruder. The strand was cooled, pelletized, and recovered.

Preparation of Norbornene Film 1

The pellet of Thermoplastic norbornene resin 1 was dissolved in methylene chloride to prepare a resin solution having a solid content of 30%. The resin solution was cast onto a stainless steel endless belt. The film on the endless belt was dried at 40° C. for forty minutes, and peeled off from the endless belt. The film was dried at 100° C. for 180 minutes and at 120° C. for 120 minutes to prepare a transparent norbornene film.

(Stretching)

The norbornene film was simultaneously biaxially stretched with a coaxial biaxial stretching machine at 160° C., a longitudinal draw ratio of 1.41 times, and a cross draw ratio of 1.41 times to prepare Norbornene film 1. The film had a thickness of 51 µm. The optical characteristics of the film were evaluated as in Example 1. The results are shown in Table below.

Comparative Example 1

Preparation of Cellulose Acylate Film 15

The following components were placed into a mixing tank, and stirred to dissolve the components. Cellulose acetate solution B was prepared.

[Composition for Cellulose Acylate Solution B]

| | |
|---|---|
| Cellulose acylate having a degree of acetylation of 2.96 | 100.0 parts by mass |
| Methylene chloride (first solvent) | 402.0 parts by mass |
| Methanol (second solvent) | 60.0 parts by mass |

(Preparation of Matting Agent Solution B)

Matting agent solution B was prepared as in Example 1 except that Cellulose acylate solution A used in the preparation of Matting agent solution A was replaced by Cellulose acylate solution B.

(Preparation of Additive Solution)

The following components were placed into a mixing tank, and stirred to dissolve the components while being heated. Thus, a cellulose acylate solution was prepared. The retardation reducing compound and the wavelength dispersion controller were the same as those in Example 1.

[Composition for Additive Solution]

| | |
|---|---|
| The above Retardation reducing compound | 54.0 parts by mass |
| The above Wavelength dispersion controller | 7.6 parts by mass |
| Methylene chloride (first solvent) | 58.4 parts by mass |
| Methanol (second solvent) | 8.7 parts by mass |
| Cellulose acetate solution B | 12.8 parts by mass |

After 94.6 parts by mass of cellulose acetate solution B, 1.3 parts by mass of Matting agent solution B, and 4.1 parts by mass of the additive solution were separately filtered, these solutions were mixed. The mixed solution was cast with a band casting machine. The mass percentages of the retardation reducing compound and the wavelength dispersion controller were 16.0% and 1.2%, respectively, based on cellulose acetate.

The resulting dope was cast with the band casting machine. The film was peeled off from the band at 45% solvent remaining in the film. Both ends of the film were held with clips in a tenter zone, and the film was dried at 95° C. under a tension of 35 kgf/m (343 N/m). At a content of the remaining solvent of 27%, the film was detached from the tenter. Cellulose acylate film 15 was prepared as in Example 1 except that the tension was 10 kgf/m (10 N/m) during conveying the film in the drying zone. The content of the solvent remaining in the film was 0.3%. The film had a thickness of 80 μm. The optical characteristics of the film were evaluated as in Example 1. The results are shown in Table below.

Comparative Example 2

Preparation of Cellulose Acylate Film 16

Cellulose acylate film 16 was prepared as in Example 1 except that the transverse tension applied to the tenter was 60 kgf/m (588 N/m). The optical characteristics of the film were evaluated as in Example 1. The results are shown in Table below.

Comparative Example 3

Preparation of Cellulose Acylate Film 17

Cellulose acylate film 17 was prepared as in Example 5 except that both ends of the film after drying were held with the tenter clips, and the film was fed through a heating zone at 240° C. The optical characteristics of the film were evaluated as in Example 1. The results are shown in Table below.

Comparative Example 4

Preparation of Thermoplastic Norbornene Resin 2

Under a nitrogen atmosphere, 500 parts of dehydrated cyclohexane, 0.82 parts of 1-hexene, 0.15 parts of dibutyl ether, and 0.30 parts of triisobutylaluminum were placed in a reactor and mixed at room temperature. While the temperature was kept at 45° C., a norbornene monomer mixture comprising 40 parts of tricyclo[4.3.0.1$^{2,5}$]dec-3,7-diene (hereinafter abbreviated to DCP), 100 parts of 7,8-benzotricyclo[4.3.0.1$^{2,5}$]dec-3-ene (hereinafter abbreviated to MTF), and 60 parts of tetracyclo[4.4.0.1$^{2,5}$.1$^{7,10}$]docec-3-ene (hereinafter abbreviated to TCD), and 40 parts of a solution of 0.7% tungsten hexachloide in toluene were continuously added over two hours for polymerization. To the polymerization solution were added 1.06 parts of butyl glycidyl ether and 0.52 parts of isopropyl alcohol to deactivate the polymerization catalyst to terminate the polymerization reaction.

Next, 270 parts of cyclohexane was added to 100 parts of the reaction solution containing the resulting ring-opened polymer, and 5 parts of a nickel-alumina hydrogenation catalyst (made by Nikki Chemical Co., Ltd.) was added thereto. The pressure was increased to 5 MPa with hydrogen. While the reaction solution was being stirred, the reaction solution was heated to 220° C. The reaction solution was reacted for four hours to prepare a reaction solution containing 20% DCP/MTF/TCD ring-opened hydrogenated polymer.

After the reaction solution was filtered to remove the hydrogenation catalyst, an antioxidant (made by Ciba Specialty Chemicals Inc., Irganox 1010) was added and dissolved in the solution in an amount of 0.1 parts based on 100 parts of the polymer. While cyclohexane as the solvent and other volatile components were being removed from the solution with a cylindrical condensation dryer (made by Hitachi, Ltd.) at a temperature of 270° C. and a pressure of 1 kPa or less, the ring-opened hydrogenated polymer was extruded in a melt state into a strand from an extruder. The strand was cooled, pelletized, and recovered.

(Preparation of Norbornene Film 2)

The pellet of Thermoplastic norbornene resin 2 was dried at 70° C. for two hours with a circulated hot air dryer to remove the moisture content, and was extruded with a T-die film melt extruder at an extruder temperature of 260° C. and a die temperature of 260° C. The extruder was equipped with a resin melt kneader having a screw of 65 mmϕ and a leaf disk polymer filter. The extruded sheet of Thermoplastic norbornene resin 2 was fed through three cooling drums (diameter: 300 mm, drum temperature: 100° C., take up rate: 0.35 m/s) to be cooled. Thus, a transparent norbornene film was prepared.

(Stretching)

The norbornene film was simultaneously biaxially stretched with a coaxial biaxial stretching machine at 136° C., a longitudinal draw ratio of 1.41 times, and a cross draw ratio of 1.41 times to prepare Norbornene film 2. The film had a thickness of 99 μm. The optical characteristics of the film were evaluated as in Example 1. The results are shown in Table below.

(Preparation of Patterned Retardation Films 1 to 19)

One surface of each of Cellulose acylate films 1 to 17 which were prepared above was saponified with an alkali. A patterned retardation layer was disposed on the surface as in Reference Example 1. Thus, Patterned retardation films 1 to 14 and 16 to 18 were prepared.

Patterned retardation layers prepared in Reference Example 1 were peeled and were bonded to one surface of Norbornene film 1 and one surface of Norbornene film 2, respectively, with an adhesive to prepare Patterned retardation films 15 and 19.

(Preparation of Polarizing Plates 1 to 19 Including Patterned Retardation Film)

A roll of a polyvinyl alcohol film having a thickness of 80 μm was continuously stretched to five times in an iodine aqueous solution, and was dried to prepare a polarizing film having a thickness of 20 μm. Using an aqueous solution of 3% polyvinyl alcohol (made by Kuraray Co., Ltd., PVA-117H) as an adhesive, the saponified surface of an alkali-saponified retardation film for an VA mode (made by FUJIFILM Corporation, Re/Rth at 550 nm=50/125) was bonded to one surface of the polarizing film. The other surface of the polarizing film was bonded to the retardation layer of each of Patterned retardation films 1 to 19 with an adhesive. Polarizing plates 1 to 19 including the patterned retardation film were prepared. In this bonding, the slow axis of the retardation film for a VA mode was orthogonal to the transmission axis of the polarizing film, and the in-plane slow axis of the patterned retardation layer was oriented ±45° to the absorption axis of the polarizing film.

(Production of Stereo Picture Displaying Apparatuses 1 to 19)

A polarizing plate on the viewer side was removed from an LCD22WMGX made by NEC, and the retardation film for a VA mode of each of Polarizing plates 1 to 19 including the patterned retardation film was bonded to the LC cell with an adhesive. Thus, Stereo picture displaying apparatuses 1 to 19 were produced.

(Evaluation of Crosstalk)

The crosstalk of the above-produced Stereo picture displaying apparatuses 1 to 19 was measured by the method described above. The crosstalks in Examples and Comparative Examples were compared with the crosstalk in Comparative Example 2, and a reduction in the crosstalk was evaluated based on the following criteria. The results are shown in Tables below.

A: a reduction of 5% or more
B: a reduction of 3% or more
C: a reduction of 1% or more
D: a reduction of 1% or less

TABLE 2

| No. | | Content of the remaining solvent (%) | Tenter tension (kgf/m) | Re (nm) | Thickness (μm) | Variation of axis (°) | Patterned retardation film No. | Evaluation |
|---|---|---|---|---|---|---|---|---|
| Example | 1 | 55 | 18 | 1 | 80 | 4 | 1 | B |
| | 2 | 55 | 15 | 1 | 40 | 5 | 2 | B |
| | 3 | 50 | 18 | 6 | 80 | 10 | 3 | B |
| | 4 | 55 | 2 | 0 | 80 | 35 | 4 | A |
| Comparative Example | 1 | 45 | 35 | 4 | 80 | 2 | 16 | D |
| | 2 | 55 | 60 | 12 | 80 | 1 | 17 | — |

TABLE 3

| No. | | Stretching temperature (° C.) | Draw ratio (%) | Heating temperature (° C.) | Solvent application | Re (nm) | Thickness (μm) | Variation of axis (°) | Patterned retardation film No. | Evaluation |
|---|---|---|---|---|---|---|---|---|---|---|
| Example | 5 | 150 | 5 | 240 | X | 20 | 80 | 3.1 | 5 | C |
| | 6 | 130 | 5 | 240 | X | 10 | 80 | 4 | 6 | C |
| | 7 | 120 | 5 | 240 | X | 5 | 80 | 5.1 | 7 | C |
| | 8 | 150 | 0 | 240 | X | 2 | 80 | 5.2 | 8 | B |
| | 9 | 130 | 0 | 240 | X | 2 | 80 | 7.6 | 9 | A |
| | 10 | 120 | 0 | 240 | X | 2 | 80 | 9.1 | 10 | A |
| | 11 | 150 | 0 | 250 | X | 2 | 80 | 6.1 | 11 | B |
| | 12 | 150 | 0 | 260 | X | 2 | 80 | 7 | 12 | A |
| | 13 | 150 | 0 | 240 | ○ | 2 | 80 | 6 | 13 | B |
| | 14 | 120 | 0 | 240 | ○ | 2 | 80 | 10.2 | 14 | A |
| Comparative Example | 3 | — | — | 240 | X | 1 | 80 | 2 | 18 | C |

TABLE 4

| No. | | Re (nm) | Thickness (μm) | Variation of axis (°) | Patterned retardation film No. | Evaluation |
|---|---|---|---|---|---|---|
| Example | 15 | 11 | 51 | 23 | 15 | B |
| Comparative Example | 4 | 10 | 99 | 2.2 | 19 | D |

From the results shown in Tables above, it can be understood that at a variation in the in-plane slow axis direction of 3° or more in the support film, the crosstalk can be reduced more significantly than in the patterned retardation film including a support film having a variation in the in-plane slow axis direction of less than 3°.

For example, in the tables, the crosstalk occurs remarkably in Comparative Example 1 due to a variation in the in-plane slow axis direction of less than 3°, while the Re of the support film is reduced to 4 nm. In contrast, the crosstalk can be reduced dramatically in Example 3 due to a variation in the in-plane slow axis direction of 3° or more, while the Re of the support film is 6 nm which is higher than that in Comparative Example 1.

In the tables, the reduction in the crosstalk is ranked as "C" in Comparative Example 3 due to a variation in the in-plane slow axis direction of less than 3°, while the Re of the support film is reduced to 1 nm. In contrast, in Examples at a variation in the in-plane slow axis direction of 3° or more, the occurrence of the crosstalk is identical to that in Comparative Example 3 even if the support film has an Re remarkably higher than that in Comparative Example 3; and the crosstalk is dramatically reduced if the support film has a low Re equal to that in Comparative Example 3.

When Example 15 is compared with Comparative Example 4, it is understood that when a film having the comparable Re is used as a support, the crosstalk can be significantly reduced through control of a variation in the in-plane slow axis to 3° or more.

In the above Examples, the in-plane slow axis can be randomized by various methods. Different support films having different main components can attain the same effect. Consequently, the effect of the present invention can be attained at a variation in the in-plane slow axis direction of 3° or more irrespective of the randomizing method or the main component of the support film.

EXPLANATION OF THE SYMBOL

10 patterned retardation film
12 patterned retardation layer
12a, 12b first retardation region and a second retardation region
14 support film
16 linearly polarizing film
20 image display panel
21 liquid crystal cell
22a, 22b linearly polarizing film
23a, 23b optical compensation film
24 protective film
30 image displaying device
40 polarizing plate
42 linearly polarizing film
44 λ/4 plate

The invention claimed is:

1. A patterned retardation film comprising at least:
    a support film having optical anisotropy, and
    a patterned retardation layer disposed on the support film and having a first retardation region and a second retardation region, at least one of an in-plane slow axis direction and a retardation being different between the first and second retardation regions,
    wherein a randomized variation in the in-plane slow axis direction of the support film is 3° or more.

2. The patterned retardation film according to claim 1, wherein the variation in the in-plane slow axis direction of the support film is 5° or more.

3. The patterned retardation film according to claim 1, wherein the variation in the in-plane slow axis direction of the support film is 7° or more.

4. The patterned retardation film according to claim 1, wherein the in-plane retardation Re(550) at a wavelength of 550 nm of the support film is 20 nm or less.

5. The patterned retardation film according to claim 2, wherein the in-plane retardation Re(550) at a wavelength of 550 nm of the support film is 20 nm or less.

6. The patterned retardation film according to claim 3, wherein the in-plane retardation Re(550) at a wavelength of 550 nm of the support film is 20 nm or less.

7. The patterned retardation film according to claim 1, wherein the Re(550) of the support film is 10 nm or less.

8. The patterned retardation film according to claim 1, wherein the Re(550) of the support film is 5 nm or less.

9. The patterned retardation film according to claim 1, wherein the first and second retardation regions have an Re(550) of 110 to 165 nm and in-plane slow axes in the first and second retardation regions are orthogonal to each other.

10. The patterned retardation film according to claim 2, wherein the first and second retardation regions have an Re(550) of 110 to 165 nm and in-plane slow axes in the first and second retardation regions are orthogonal to each other.

11. The patterned retardation film according to claim 3, wherein the first and second retardation regions have an Re(550) of 110 to 165 nm and in-plane slow axes in the first and second retardation regions are orthogonal to each other.

12. The patterned retardation film according to claim 4, wherein the first and second retardation regions have an Re(550) of 110 to 165 nm and in-plane slow axes in the first and second retardation regions are orthogonal to each other.

13. The patterned retardation film according to claim 7, wherein the first and second retardation regions have an Re(550) of 110 to 165 nm and in-plane slow axes in the first and second retardation regions are orthogonal to each other.

14. A patterned polarizing plate comprising at least:
the patterned retardation film according to claim 1, and
a linearly polarizing film.

15. A patterned polarizing plate comprising at least:
the patterned retardation film according to claim 4, and
a linearly polarizing film.

16. A patterned polarizing plate comprising at least:
the patterned retardation film according to claim 9, and
a linearly polarizing film.

17. An image displaying device comprising:
an image display panel, and
the patterned retardation film according to claim 1, which is disposed on a surface on a viewer side of the image display panel.

18. An image displaying device comprising:
an image display panel, and
the patterned polarizing plate according to claim 14, which is disposed on a surface on a viewer side of the image display panel.

19. A stereo picture displaying system comprising:
the image displaying device according to claim 17, and
a polarizing plate disposed between the image displaying device and a viewer.

20. A stereo picture displaying system comprising:
the image displaying device according to claim 18, and
a polarizing plate disposed between the image displaying device and a viewer.

21. The patterned retardation film according to claim 1, wherein the support film is a cellulose polymer.

* * * * *